US005478463A

United States Patent [19]

Brownawell et al.

[11] Patent Number: 5,478,463

[45] Date of Patent: Dec. 26, 1995

[54] METHOD OF REDUCING SLUDGE AND VARNISH PRECURSORS IN LUBRICATING OILS

[75] Inventors: Darrell W. Brownawell, Scotch Plains; Warren A. Thaler, Flemington, both of N.J.; Cruise K. Jones, Easton, Pa.; Jacob Emert, Brooklyn, N.Y.; Abhimanyu O. Patil, Westfield, N.J.

[73] Assignee: Exxon Chemical Patents Inc., Linden, N.J.

[21] Appl. No.: 281,720

[22] Filed: Jul. 28, 1994

Related U.S. Application Data

[63] Continuation of Ser. No. 49,210, Apr. 19, 1993, abandoned, which is a continuation-in-part of Ser. No. 895,192, Jun. 5, 1992, abandoned, which is a continuation of Ser. No. 749,063, Aug. 23, 1991, abandoned, which is a division of Ser. No. 404,040, Sep. 7, 1989, Pat. No. 5,042,617.

[51] Int. Cl.$^6$ .................................................... B01D 37/00

[52] U.S. Cl. .................... 208/180; 208/182; 123/196 A; 210/729; 210/732; 210/735; 210/749; 210/806

[58] Field of Search ....................... 123/196 A; 208/182, 208/183, 180; 210/668, 712, 679, 729, 690, 732, 749, 735, 806, 168, 314, 315, 209, 909, 416.5

[56] References Cited

U.S. PATENT DOCUMENTS

| | | | |
|---|---|---|---|
| 2,303,546 | 12/1942 | Greger | 196/16 |
| 2,343,427 | 3/1944 | Wells et al. | 252/326 |
| 2,609,931 | 9/1952 | Rodman et al. | 210/62 |
| 3,305,478 | 2/1967 | Gilson et al. | 208/180 |
| 3,336,223 | 8/1967 | Kneeland | 210/506 |
| 3,523,074 | 8/1970 | Geyer et al. | 208/179 |
| 3,715,037 | 2/1973 | Shin-EnHo et al. | 210/506 |
| 3,749,247 | 7/1973 | Rohde | 210/501 |
| 4,075,098 | 2/1978 | Paul et al. | 210/209 |
| 4,105,571 | 8/1978 | Shaub et al. | 252/32.7 E |
| 4,636,322 | 1/1987 | Nalesnik | 252/51.5 A |
| 4,751,901 | 6/1988 | Moor | 210/497.1 |
| 4,906,389 | 3/1990 | Brownawell et al. | 208/182 |
| 4,906,489 | 3/1990 | Flango et al. | 426/579 |
| 4,977,871 | 12/1990 | Brownawell et al. | 210/282 |
| 4,997,546 | 3/1991 | Shaub et al. | 210/668 |
| 5,042,617 | 8/1991 | Brownawell et al. | 184/6.24 |
| 5,068,044 | 11/1991 | Brownawell et al. | 252/25 |
| 5,069,799 | 12/1991 | Brownawell et al. | 210/749 |
| 5,112,482 | 5/1992 | Shaub et al. | 210/209 |
| 5,156,758 | 10/1992 | Thaler et al. | 525/301 |
| 5,209,842 | 5/1993 | Moor | 210/168 |
| 5,225,081 | 7/1993 | Brownawell | 210/168 |

FOREIGN PATENT DOCUMENTS

| | | | |
|---|---|---|---|
| 371639 | 6/1990 | European Pat. Off. . | |
| 416906 | 3/1991 | European Pat. Off. . | |
| 416908 | 3/1991 | European Pat. Off. . | |
| 529979 | 3/1993 | European Pat. Off. . | |
| 687945 | 2/1953 | United Kingdom | 210/506 |

OTHER PUBLICATIONS

"Effect of Soot on Piston Deposits and Crankcase Oils–Infrared Spectrometric Technique for Analyzing Soot", J. A. McGeehan and B. J. Fontana, SAE paper 801368, 1981.

"Standard Test Method for Compositional Analysis by Thermogravimetry" ASTM E1131, pp. 653–657.

*Primary Examiner*—Peter A. Hruskoci
*Attorney, Agent, or Firm*—Mary M. Allen

[57] ABSTRACT

A method, composition and filter for reducing the presence of sludge or varnish precursors in a lubricating oil circulating within an internal combustion engine. The lubricating oil containing sludge or varnish precursors is contacted with discrete particles of an oil insoluble, oil wettable compound having an antioxidant functional group and/or a dispersant functional group, which are capable of complexing with sludge or varnish precursors. Preferably the compounds comprises a crosslinked amine having ethylene amine functionality. The starting polyethylene amines have a number average molecular weight in the range of about 100 to about 60,000, preferably 200 to 250 and are crosslinked with a silicon oxide, silane, silicate, epoxide, quinone, or phenol-formaldehyde crosslinking agent. The particles are encaged within a one or two stage oil filter together with filtering media such as chemically active filter media, physically active filter media and inactive filter media.

9 Claims, No Drawings

METHOD OF REDUCING SLUDGE AND VARNISH PRECURSORS IN LUBRICATING OILS

CROSS REFERENCE TO RELATED APPLICATION

This is a continuation of application Ser. No. 08/049,210, filed Apr. 19, 1993, abandoned, which is a Continuation-in-Part of U.S. Ser. No. 895,192, filed Jun. 5, 1992, abandoned, which is a R.62 Continuation of U.S. Ser. No. 749,063, filed Aug. 23, 1991, now abandoned, which is a R.60 Division of U.S. Ser. No. 404,040, filed Sep. 7, 1989, now U.S. Pat. No. 5,042,617.

BACKGROUND OF THE INVENTION

1. Field of the Invention

The present invention pertains to a method, apparatus and compositions for removing sludge and varnish precursors from a lubricating oil disposed within an internal combustion engine and for improving the oxidative stability of the lubricating oil. More particularly, the invention pertains to a method, apparatus and compositions for achieving this purpose by contacting the oil with an insoluble particle having a dispersant functional group and in some cases also an antioxidant functional group. The particle may be in the form of a porous slab, a thin film, or in the form of discrete particles which are within a circulating oil system but do not have a core substrate. These discrete particles may be "encaged", i.e. held inside of some large structural member by means of filter paper, wire mesh or by some other suitable means.

2. Description of Related Art

It is known in the art that during the combustion of fossil fuels, for example, gasoline or diesel fuel, in an internal combustion engine, polar hydrocarbon contaminants are formed due to incomplete combustion of the fuel. Typical contaminants include low molecular weight polar alkyl compounds such as alcohols, aldehydes, ketones, carboxylic acids, and the like. These contaminants are sludge and varnish precursors which pass into the lubricating oil with combustion blow-by gases where they contact water in the oil and agglomerate to form an emulsion which is commonly referred to as sludge. Sludge and varnish precursors can also arise from oil oxidation. The presence of sludge in the oil is undesirable because it tends to increase oil viscosity, promote the presence of varnish on hot engine parts, and plug oil passageways. The most common solution in the art for this problem has been to incorporate dispersants and antioxidants in the lubricating oil to increase the ability of the oil to suspend sludge. While this decreases the detrimental effect on viscosity, varnish, and passageway plugging, over time the ability of an oil to protect an engine becomes limited. A particular problem is that commonly used dispersants suspend the sludge in such a finely divided form that the sludge passes through oil filters and remains in the oil with subsequent viscosity increase rather than being removed by the filter. It would therefore be most desirable to employ a method for removing sludge and varnish precursors from a lubricating oil and thereby avoid the undesired result of leaving the sludge suspended in the oil.

It is known from U.S. Pat. No. 5,042,617, which is incorporated herein by reference, that compounds having dispersant functional groups (i.e. a functional group that complexes or reacts with sludge and varnish precursors) can be used within the oil circulation system of an internal combustion engine when such compounds are incorporated on a substrate. The present invention greatly improves on this method since the need for a substrate is eliminated. This substantially saves on the space required in an oil filter and significantly increases the amount of space available to accommodate removed sludge and varnish precursors. Elimination of the substrate also represents a cost savings. Retaining the particles of composition having a dispersant functional group or an antioxidant functional group on or between sheets of filter paper in order to keep them from moving about is very different from intimately depositing these compounds on a substrate.

It has now been found that the presence of sludge can be significantly decreased in circulating lubricating oils by contacting the sludge and varnish precursors with discrete particles of a composition having a dispersant functional group with or without an antioxidant functional group that is encaged within the circulating oil system, but not intimately adhered to or immobilized on a substrate. It is believed that the sludge and varnish precursors complex with the dispersant functional group and become immobilized on the particles. Preferably, the dispersant functional group is a crosslinked polyethylene amine which is in the form of discrete particles encaged within a conventional oil filter.

SUMMARY OF THE INVENTION

The invention provides a method of reducing the presence of sludge or varnish precursors in a lubricating oil which comprises contacting a lubricating oil containing sludge or varnish precursors with a plurality of discrete oil insoluble, oil wettable particles wherein each particle has a dispersant functional group and in some cases an antioxidant functional group, which groups are capable of complexing with sludge or varnish precursors and which discrete solid particles which are not deposited on a substrate, thereby causing at least a portion of the sludge or varnish precursors to become immobilized on said particles.

The invention also provides a method for reducing the presence of sludge or varnish precursors in a lubricating oil by providing a plurality of oil insoluble, oil wettable, solid particles wherein each particle has a dispersant functional group and in some cases an antioxidant functional group, which particles are capable of complexing with sludge or varnish precursors; and encaging said particles in the path of a lubricating oil circulating within an internal combustion engine without adhering said particles to a substrate, which encaging prevents the transmigration of said particles to said internal combustion engine by the lubricating oil.

The invention also provides particles having a dispersant functional group and in some cases an antioxidant functional group, which are capable of complexing with sludge or varnish precursors and of reducing the presence of sludge in a lubricating oil, which particles comprise polyamine polymers having a molecular weight in the range of from about 100 to about 60,000 which are crosslinked with a crosslinking agent selected from the group consisting of metal alkoxides, silanes, silicates, epoxides, quanones, and phenol-formaldehyde compounds. Other suitable chain extending, cross-linking and insolubilizing agents may be utilized as are known to those skilled in the art.

The invention further provides an article of manufacture for reducing the presence of sludge or varnish precursors in a lubricating oil including a plurality of oil insoluble, oil wettable, solid particles wherein each particle has a dispersant functional group and in some cases an antioxidant functional group, which particles are capable of complexing with sludge or varnish precursors; and means for encaging said particles in the path of a lubricating oil circulating within an internal combustion engine without adhering said particles to a substrate, which encaging means prevents the transmigration of said particles to said internal combustion engine by the lubricating oil.

The invention still further provides an oil filter which comprises, a hollow, oil impermeable housing having oil ingress and oil egress means; and a plurality of oil insoluble, oil wettable, solid particles in said housing, each of said particles having a dispersant functional group and in some cases an antioxidant functional group, which particles are capable of complexing with sludge or varnish precursors; and means for encaging said particles between said oil ingress and oil egress means, such particles not having been deposited on a substrate, which encaging means prevents the removal of said particles from said housing by a lubricating oil when such oil is within said housing; and at least one filtering media selected from the group consisting of chemically active filter media, physically active filter media and inactive filter media.

DETAILED DESCRIPTION OF THE PREFERRED EMBODIMENT

In current practice dispersants are typically blended within a motor oil and comprise a solubilizing group such as polybutene and a functional group that complexes, reacts or interacts with sludge, sludge presursors and varnish precursors (hereinafter referred to as dispersant functional group). Also, antioxidants are typically blended within a motor oil and may comprise a solubilizing group and an active antioxidant functional group. An antioxidant functional group is a chemical group that protects a lubricating oil from oxidation without the need for a solubilizing group, although one may be present. According to this invention, sludge and varnish precursors can be removed from a lubricating oil and antioxidation protection provided without the need for a solubilizing group by incorporating an antioxidant functional group and/or a dispersant functional group in the form of discrete particles positioned in the path of circulating engine oil. Contrary to the dispersants and antioxidants blended in oil, the particle containing a dispersant functional group or antioxidant functional group useful within the context of the present invention are those which are oil insoluble but oil wettable. Essentially any such dispersant functional group which will complex with sludge or varnish precursors can be used. Examples of suitable dispersant functional groups are, separately or in combination, amines, polyamines, morpholines, oxazolines, piperazines, alcohols, polyols, polyethers, or substituted versions thereof (e.g. alkyl, dialkyl, aryl, alkaryl or aralkyl amines, etc.) Preferred dispersant functional groups include polyethylene amines, other substituted amines (e.g. polypropylene amines), pentaerythritol, aminopropyl morpholine, their derivatives, or mixtures thereof. Examples of derivatives include, but are not limited to, salts of these dispersant functional groups; reaction products of these functional groups with sultones, cyclic anhydrides, or their neutralized derivatives (e.g. metal sulfonate or carboxylate salts); hydrocarbon insoluble polymers bound to these functional groups; organic or inorganic polymer matrices in which these functional groups are bound or chemisorbed; and copolymers containing these functional groups. Examples of these include polymers which incorporate polyethylene amines or polyolefins containing polyethylene amine in which the hydrocarbon portion has been rendered porous and insoluble. Polyethylene amines are a particularly effective functional group. In the most preferred embodiment, the useful particles are crosslinked amines having ethylene amine functionality. One preferred class of polyethylene amines are those commercially available from the Virginia Chemical group of Hoechst Celanese Corporation as Corcat$^R$ grades P-12, P-18, P-150 and JP-600. These have number average molecular weights ranging from about 100 to about 60,000, preferably from about 1,000 to about 5,000 and more preferably from about 1,000 to about 3,000. Other amines include 2-methylpentamethylene diamine, diethylene triamine, triethylene tetraamine. The most preferred class of amines includes Polyamine H, a bottoms product formed in the manufacture of polyethylene amine which contains approximately 6–8 ethylene groups and is commercially available from Union Carbide. These amines are preferably crosslinked by a crosslinking agent, for example those selected from the group consisting of metal alkoxides, silanes, silicates, quinones, and phenol-formaldehyde compounds. The most preferred crosslinking agent is benzoquinone. The most preferred antioxidant functional group is benzoquinone.

The amount of dispersant functional group containing particles used can vary broadly depending upon the amount of sludge or sludge and varnish precursors in the oil. However, although only an amount effective to reduce the sludge and varnish precursor content of the lubricating oil need be used, the amount will typically range from about 0.1 to about 10 wt. %, preferably from about 0.2 to about 2.0 wt. %, based on weight of the lubricating oil, provided the dispersant functional group particles are the only dispersant functional group in the system. The particles having a dispersant functional group are in the form of discrete particles which may have a particle size ranging from about 0.001 mm to about 50 mm, preferably from about 0.01 mm to about 10 mm and most preferably from about 0.1 mm to about 5 mm. The discrete particles are positioned in the path of a lubricating oil circulating within an internal combustion engine without adhering or having deposited the particles on a substrate. This is preferably done by encaging them within a filter media to prevent the transmigration of the particles to said internal combustion engine by the lubricating oil. One method of encaging such particles is to dispose them with or without a small amount of binder polymer between sheets of conventional paper or filter media in a typical oil filter. Another method may be by enclosing the particles within a netting or screen material. Any method of encaging is useful provided the particles remain discrete, to expose essentially their entire surface area to circulating oil, while preventing the migration of the particles to the combustion chamber of the engine. The particles can be located within or external to the lubrication system of the internal combustion engine. Preferably, the particles will be located within the lubrication system such as on the engine block or near the sump.

Sludge and sludge precursors are present in essentially any lubricating oil used in the lubrication system of essentially any internal combustion engine, including automobile and truck engines, two-cycle engines, aviation piston engines, marine and railroad engines, gas-fired engines, alcohol (e.g. methanol) powered engines, stationary powered engines, turbines, and the like. The sludge precursors are commonly produced as the result of reaction between combustion by-products, fuel and lubricant. Another source of sludge precursors is oil or additive oxidation.

In addition to sludge and sludge presursors, the lubricating oil will normally comprise a major amount of lubricating oil basestock or lubricating base oil, and a minor amount of one or more additives. The lubricating oil basestock can be derived from natural lubricating oils, synthetic lubricating oils, or mixtures thereof. In general, the lubricating oil basestock will have a viscosity in the range of about 5 to about 10,000 cSt at 40° C., although typical applications will require an oil having a viscosity ranging from about 10 to about 1,000 cSt at 40° C.

Natural lubricating oils include animal oils, vegetable oils (e.g. castor oil and lard oil), petroleum oils, mineral oils, and oils derived from coal or shale. Synthetic oils include hydrocarbon oils and halo-substituted hydrocarbon oils such as polymerized and interpolymerized olefine (e.g. polybutylenes, polypropylenes, propylene-isobutylene copolymers, chlorinated polybutylenes, poly(1-hexenes), poly(1-octenes), poly(1-decenes), etc., and mixtures thereof); alkylbenzenes (e.g. dodecylbenzenes, tetradecylbenzenes, dinonylbenzenes, di(2-ethylhexyl) benzene, etc.); polyphenyls (e.g. biphenyls, terphenyls, alkylated polyphenyls, etc.); alkylated diphenyl ethers, alkylated diphenyl sulfides, as well as their derivatives, analogs, and homologs thereof; and the like. Synthetic lubricating oils also include alkylene oxide polymers, interpolymers, copolymers and derivatives thereof wherein the terminal hydroxyl groups have been modified by esterification, etherification, etc. This class of synthetic oils is exemplified by polyoxyalkylene polymers prepared by polymerization of ethylene oxide or propylene oxide; the alkyl and aryl ethers of these polyoxyalkylene polymers (e.g. methyl-polyisopropylene glycol ether having an average molecular weight of 1000, diphenyl ether of polyethylene glycol having a molecular weight of 500–1000, diethyl ether of polypropylene glycol having a molecular weight of 1000–1500); and mono- and polycarboxylic esters thereof (e.g., the acetic acid esters, mixed $C_3$–$C_8$ fatty acid esters, and $C_{13}$ oxo acid diester of tetraethylene glycol). Another suitable class of synthetic lubricating oils comprises the esters of dicarboxylic acids (e.g., phthalic acid, succinic acid, alkyl succinic acids and alkenyl succinic acids, maleic acid, azelaic acid, suberic acid, sebasic acid fumaric acid, adipic acid, linoleic acid dimer, malonic acid, alkylmalonic acids, alkenyl malonic acids, etc.) with a variety of alcohols (e.g. butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid, and the like. Esters useful as synthetic oils also include those made from $C_5$ to $C_{12}$ monocarboxylic acids and polyols and polyol ethers such as neopentyl glycol, trimethylolpropane, pentaerythritol, dipentaerythritol, tripentaerythritol, and the like. Synthetic hydrocarbon oils are also obtained from hydrogenated oligomers of normal olefins. Silicon-based oils (such as the polyalkyl-, polyaryl-, polyalkoxy-, or polyaryloxy-siloxane oils and silicate oils) comprise another useful class of synthetic lubricating oils. These oils include tetraethyl silicate, tetraisopropyl silicate, tetra-(2-ethylhexyl) silicate, tetra-(4-methyl-2-ethylhexyl) silicate, tetra(p-tert-butylphenyl) silicate, hexa-( 4-methyl-2-pentoxy)-disiloxane, poly(methyl)-siloxanes and poly(methylphenyl) siloxanes, and the like. Other synthetic lubricating oils include liquid esters of phosphorus-containing acids (e.g., tricresyl phosphate, trioctyl phosphate, diethyl ester of decylphosphonic acid), polymeric tetrahydrofurans, polyalphaolefins, and the like.

The lubricating oil may be derived from unrefined, refined, rerefined oils, or mixtures thereof. Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Rerefined oils are obtained by treating refined oils in processes similar to those used to obtain the refined oils. These rerefined oils are also known as reclaimed or reprocessed oils and often are additionally processed by techniques for removal of spent additives and oil breakdown products. The lubricating base oil may contain one or more additives to form a fully formulated lubricating oil. Such lubricating oil additives include antiwear agents, antioxidants, corrosion inhibitors, detergents, pour point depressants, extreme pressure additives, viscosity index improvers, friction modifiers, and the like. Typical additives are shown in U.S. Pat. No. 4,105,571, the disclosure of which is incorporated herein by reference. Normally, there is from about 1 to about 20 wt. % of these additives in a fully formulated engine lubricating oil. Dispersants and antioxidants may also be included as additives in the oil if desired, although this invention partially or completely negates their need. However, the precise additives used and their relative amounts will depend upon the particular application of the oil.

This invention can also be combined with the removal of sludge or varnish precursors from a lubricating oil as described in U.S. Pat. No. 5,042,617 and discussed earlier herein. This method provides for the incorporation of a dispersant functional group immobilized by intimate association with a substrate.

Any of the foregoing embodiments of the invention can be combined with a system for reducing piston deposits in an internal combustion engine which result from neutralizing acids present in the lubricating oil of the engine. The system provides a lubricating oil that circulates through the lubrication system of the engine, and a soluble weak base capable of neutralizing acids present in the oil to form soluble neutral salts containing the weak base and the acids. There is a heterogeneous strong base immobilized within the lubrication system of the engine, the strong base being capable of displacing the weak base from the soluble neutral salts such that the weak base is returned to the lubricating oil and the resulting strong base/acid salt is deposited or immobilized with the heterogeneous strong base. This system is more fully described in U.S. Pat. Nos. 4,906,489 and 5,068,044 which are incorporated herein by reference. This embodiment requires that a weak base be present in the lubricating oil. The weak base will normally be added to the lubricating oil during its formulation or manufacture. Broadly speaking, the weak bases can be basic organophosphorus compounds, basic organonitrogen compounds, or mixtures thereof, with basic organonitrogen compounds being preferred. Families of basic organophosphorus and organonitrogen compounds include aromatic compounds, aliphatic compounds, cycloaliphatic compounds, or mixtures thereof. Examples of basic organonitrogen compounds include, but are not limited to, pyridines; anilines; piperazines; morpholines; alkyl, dialkyl, and trialkyl amines; alkyl polyamines; and alkyl and aryl guanidines. Alkyl, dialkyl, and trialkyl phosphines are examples of basic organophosphorus compounds. Examples of particularly effective weak bases are the dialkyl amines ($R_2HN$), trialkyl amines ($R_3N$), dialkyl phosphines ($R_2HP$), and trialkyl phosphines ($R_3P$), where R is an alkyl group, H is hydrogen, N is nitrogen, and P is phosphorus. All of the alkyl groups in the amine or phosphine need not have the same chain length. The alkyl group should be substantially saturated and from 1 to 22 carbons in length. For the di- and tri- alkyl phosphines and the di- and tri- alkyl amines, the total number of carbon atoms in the alkyl groups should be from 12 to 66. Preferably, the individual alkyl group will be from 6 to 18, more preferably from 10 to 18, carbon atoms in length. Trialkyl amines and trialkyl phosphines are preferred over the dialkyl amines and dialkyl phosphines. Examples of suitable dialkyl and trialkyl amines (or phosphines) include tributyl amine (or phosphine), dihexyl amine (or phosphine), decylethyl amine (or phosphine), trihexyl amine (or phosphine), trioctyl amine (or phosphine), trioctyldecyl amine (or phosphine), tridecyl amine (or phosphine), dioctyl amine (or phosphine), trieicosyl amine (or phosphine), tridocosyl amine (or phosphine), or mixtures thereof. Preferred trialkyl amines are trihexyl amine, trioctadecyl amine, or mixtures thereof, with trioctadecyl amine being particularly preferred. Preferred trialkyl phosphines are trihexyl phosphine, trioctyldecyl phosphine, or mixtures thereof, with trioctadecyl phosphine being particularly preferred. Still another example of a suitable weak base is a polyethyleneamine imide or amide of polybutenylsuccinic anhydride with more than 40 carbons in the polybutenyl group (see for example U.S. Pat. No. 5,164,101 which is incorporated herein by reference). The weak base must be strong enough to neutralize the combustion acids (i.e., form a salt). Suitable weak bases will typically have a PKa from about 4 to about 12. However, even strong organic bases (such as organoguanidines) can be utilized as the weak base if the strong base is an appropriate oxide or hydroxide and is capable or releasing the weak base from the weak base/combustion acid salt.

The molecular weight of the weak base should be such that the protonated nitrogen compound retains its oil solubility. Thus, the weak base should have sufficient solubility so that the salt formed remains soluble in the oil and does not precipitate. Adding alkyl groups to the weak base is the preferred method to ensure its solubility. The amount of weak base in the lubricating oil for contact at the piston ring zone will vary depending upon the amount of combustion acids present, the degree of neutralization desired, and the specific applications of the oil. In general, the amount need only be that which is effective or sufficient to neutralize at least a portion of the combustion acids present at the piston ring zone. Typically, the amount will range from about 0.01 to about 3 wt. % or more, preferably from about 0.1 to about 1.0 wt. %. Following neutralization of the combustion acids, the neutral salts are passed or circulated from the piston ring zone with the lubricating oil and contacted with a heterogeneous strong base. By strong base is meant a base that will displace the weak base from the neutral salts and return the weak base to the oil for recirculation to the piston ring zone where the weak base is reused to neutralize combustion acids. Examples of suitable strong bases include, but are not limited to, barium oxide (BaO), magnesium carbonate ($MgCO_3$), magnesium hydroxide ($Mg(OH)_2$), magnesium oxide (MgO), sodium aluminate ($NaAlO_2$), sodium carbonate ($Na_2CO_3$), sodium hydroxide (NaOH), zinc oxide (ZnO), or their mixtures, with MgO being particularly preferred. By "heterogeneous" strong base is meant that the strong base is in a separate phase (or substantially in a separate phase) from the lubricating oil, i.e., the strong base is insoluble or substantially insoluble in the oil. The strong base may be incorporated (e.g. impregnated) on or with a substrate immobilized in the lubricating system of the engine, but subsequent to (or downstream of) the piston ring zone. Thus, the substrate can be located on the engine block or near the sump. Preferably, the substrate will be part of the filter system for filtering oil, although it could be separate therefrom. Suitable substrates include, but are not limited to, alumina, activated clay, cellulose, cement binder, silica alumina, and activated carbon. The alumina, cement binder, and activated carbon are preferred, with cement binder being particularly preferred. The substrate may (but need not) be inert. The amount of strong base required will vary with the amount of weak base in the oil and the amount of combustion acids formed during engine operation. However, since the strong base is not being continuously regenerated for reuse as is the weak base (i.e., the alkyl amine), the amount of strong base must be at least equal to (and preferably be a multiple of) the equivalent weight of the weak base in the oil. Therefore, the amount of strong base should be from 1 to about 15 times, preferably from 1 to about 5 times, the equivalent weight of the weak base in the oil. Once the weak base has been displaced from the soluble neutral salts, the strong base/strong combustion acid salts thus formed will be immobilized as heterogeneous deposits with the strong base or with the strong base on a substrate if one is used. Thus, deposits which would normally be formed in the piston ring zone are not formed until the soluble salts contact the strong base. Preferably, the strong base will be located such that it can be easily removed from the lubrication system (e.g. included as part of the oil filter system).

The presence of a strong base also serves to protect the crosslinked dispersant functional group containing composition of this invention from the acids generated by an internal combustion engine. The crosslinked dispersant functional group containing compositions used by this invention are generally weakly basic. Thus when such engine acids are carried to the filter, the crosslinked dispersant functional group containing composition would be neutralized and lose its functionality. The strong base would neutralize the engine acids before they could neutralize the dispersant functional group and hence protect them.

Any of the foregoing embodiments of this invention can be combined with the removal of carcinogenic components from a lubricating oil. For example, polynuclear aromatic hydrocarbons (especially PNA's with at least three aromatic rings) that are usually present in used lubricating oil can be substantially removed (i.e., reduced by from about 60 to about 90% or more) by passing the oil through a sorbent located within the lubrication system through which the oil must circulate after being used to lubricate the engine. The sorbent may be immobilized with the substrate described above or immobilized separate therefrom. Preferably, the substrate and sorbent will be part of the engine filter system for filtering oil. The sorbent can be conveniently located on the engine block or near the sump, preferably downstream of the oil as it circulates through the engine; i.e., after the oil has been heated. Most preferably, the sorbent is downstream of the substrate when a substrate is present.

Suitable sorbents include activated carbon, attapulgus clay, silica gel, molecular sieves, dolomite clay, alumina, zeolite, or mixtures thereof. Activated carbon is preferred because it is at least partially selective to the removal of polynuclear aromatics containing more than 3 (and preferably 4, 5 and 6) aromatic rings; the PNA's removed are tightly bound to the carbon and will not be leached-out to become free PNA's after disposal; the PNA's removed will not be redissolved in the used lubricating oil; and heavy metals such as lead and chromium will be removed as well. Although most activated carbons will remove PNA's to some extent, wood and peat based carbons are significantly more effective in removing three and four ring aromatics than coal or coconut based carbons. The amount of sorbent required will depend upon the PNA concentration in the lubricating oil. Typically, for a five quart oil change, about 20 to 150 grams of activated carbon can reduce the PNA content of the used lubricating oil by up to 90%. Used lubricating oils usually contain from about 10 to about 10,000 ppm of PNA's.

It may be necessary to provide a container to hold the sorbent, such as a circular mass of sorbent supported on wire gauze. Alternatively, an oil filter could comprise the sorbent capable of combining with polynuclear aromatic hydrocarbons held in pockets of filter paper. Alternatively, the sorbent could be in the form of a solid cylinder as in allowed U.S. Pat. No. 5,225,081, issued Jul. 6, 1993, which is incorporated herein by reference.

Any of the foregoing embodiments of this invention can also be combined with a sorbent, such as those described above that is mixed, coated, or impregnated with additives normally present in engine lubricating oils. In this embodiment, additives, such as the lubricating oil additives described above, are slowly released into the lubricating oil to replenish the additives as they are depleted during operation of the engine. The ease with which the additives are released into the oil depends upon the nature of the additive and the sorbent. Preferably, however, the additives will be totally released within 150 hours of engine operation. In addition, the sorbent may contain from about 50 to about 100 wt. % of the additive, based on the weight of activated carbon, which generally corresponds to 0.5 to 1.0 wt. % of the additive in the lubricating oil. Thus, the various embodiments of this invention can be combined to remove PNA's from a lubricating oil, to extend the useful life of a lubricating oil by releasing conventional additives into the oil, or both. A fuller description of these embodiments of PNA removal and slow release is presented in U.S. Pat. No. 4,977,871 which is incorporated herein by reference.

This invention may also be combined with any method for removing hydroperoxides from a lubricating oil by contacting the oil with a heterogeneous hydroperoxide decomposer for a period of time sufficient to cause a reduction in the amount of hydroperoxides present in the oil. Hydroperoxides are produced when hydrocarbons in the lubricating oil contact the peroxides formed during the fuel combustion process. As such, hydroperoxides will be present in essentially any lubricating oil used in the lubrication system of essentially any internal combustion engine, including those mentioned above. U.S. Pat. No. 4,997,546 and 5,112,482, which are incorporated herein by reference, disclose the use of compounds, especially certain molybdenum compounds which decompose hydroperoxides. These include compounds such as $MoS_2$, $Mo_4S_4(ROCS_2)_6$, and NaOH or mixtures thereof. The compounds of U.S. Pat. No. 4,997,546 and U.S. Pat. No. 5,112,482 function by being placed in a suitable container, such as an oil filter where lubricating oil is pumped over them and in which they decompose hydroperoxides. The hydroperoxide decomposer is immobilized when contacting the oil so as not to pass into the oil. One preferred hydroperoxide decomposer embodiment uses sodium hydroxide as described in allowed U.S. patent application Ser. No. 846,368 (now U.S. Pat. No. 5,209,839) which is incorporated herein by reference. More specifically, when the hydroperoxide decomposer is heterogeneous NaOH, hydroperoxides can be effectively removed from used lubricating oil provided the oil also contains a metal thiophosphate. The NaOH should be immobilized in some manner when contacting the oil, for example in crystalline form or incorporated on a substrate to avoid solids passing into the oil. In this preferred embodiment, hydroperoxides are removed from lubricating oil circulating within the lubrication system of an internal combustion engine by contacting the oil with crystalline NaOH immobilized within the lubrication system.

The precise amount of hydroperoxide decomposer used can vary broadly, depending upon the amount of hydroperoxide present in the lubricating oil. However, although only an amount effective or sufficient to reduce the hydroperoxide content of the lubricating oil need be used, the amount of decomposer will typically range from about 0.01 to about 2.0 wt. %, although greater amounts could be used. Preferably, from about 0.05 to about 1.0 wt. % (based on weight of the lubricating oil) of the decomposer will be used. The hydroperoxide decomposer should be immobilized in some manner when contacting the oil. For example, it could be immobilized on a substrate. However, a substrate would not be required if the decomposer were in crystalline form. If a substrate were used, the substrate may (or may not) be within the lubrication system of an engine. Preferably, however, the substrate will be located within the lubrication system, for example on the engine block or near the sump. More preferably, the substrate will be part of the filter system for filtering the engine's lubricating oil, although it could be separate therefrom. Suitable substrates include, but are not limited to, alumina, activated clay, cellulose, cement binder, silica-alumina, and activated carbon. Alumina, cement binder, and activated carbon are preferred substrates, with activated carbon being particularly preferred. The substrate may (but need not) be inert and can be formed into various shapes such as pellets or spheres. The decomposer may be incorporated on or with the substrate by methods known to those skilled in the art. For example, if the substrate were activated carbon, the decomposer can be deposited by using the following technique. The decomposer is dissolved in a volatile solvent. The carbon is then saturated with the decomposer containing solution and the solvent evaporated, leaving the decomposer on the carbon substrate.

When NaOH is used as the decomposer, the required metal thiophosphates used preferably comprises a metal selected from the group consisting of Group IB, IIB, VIB, VIII of the Periodic Table, and mixtures thereof. A metal dithiophosphate is a preferred metal thiophosphate, with a metal dialkyldithiophosphate being particularly preferred. Copper, nickel, and zinc are particularly preferred metals, with zinc being most preferred. The alkyl groups preferably comprise from 3 to 10 carbon atoms. Particularly preferred metal thiophosphates are zinc dialkyl-dithiophosphates. The amount of metal thiophosphate used in this invention can range broadly. Typically, however, the concentration of the metal thiophosphate will range from about 0.1 to about 2 wt. %, preferably from about 0.3 to about 1 wt. %, of the lubricating oil. NaOH and metal thiophosphates are commercially available from a number of vendors. As such, their methods of manufacture are well known to those skilled in the art.

The foregoing invention may further be employed in conjunction with an oil filter system which can be a one stage or two stage filter. A typical oil filter comprises a canister containing a chemically active filter media, a physically active filter media, an inactive filter media or combinations thereof. Most preferably, the invention uses a two stage oil filter containing, in series, a first filter media having a chemically active filter media, a physically active filter media, or mixtures thereof and a second filter media having an inactive filter media can effectively rejuvenate used lubricating oils. In a preferred embodiment, the chemically or physically active filter media will be within a canister that is separate from a container having both active and inactive filter media. This filter system is more fully described in U.S. Pat. No. 5,069,799, which is incorporated herein by reference. Another useful filtering system uses a hollow solid composite composed of a thermoplastic binder and an active filter media that contains a chemically active or physically active filter media or both. Such is more fully described in the aforesaid U.S. Pat. No. 5,225,081. By "chemically active filter media" is meant a filter media that chemically interacts with the used lubricating oil (e.g., by chemical adsorption, acid/base neutralization, and the like). By "physically active filter media" is meant a filter media that interacts with the lubricating oil by other than chemical interaction (e.g., by physical adsorption). The chemically active filter media will be or will contain a chemically active ingredient or ingredients, which may be supported on a substrate or unsupported. If supported, suitable substrates include those listed above. The substrate may but need not be inert. One example of a chemically active filter media is a filter media that is or contains an oil insoluble, or substantially oil insoluble, strong base. By "inactive filter media" is meant a filter media that is inert and does not interact with the lubricating oil except to remove particulates from the oil. The physically active filter media includes the same substrates suitable for use with the chemically active filter media as well as other substrates such as attapulgus clay, dolomite clay, and molecular sieves. An example of a physically active filter media is a media such as activated carbon that can remove polynuclear aromatics (PNA) from used lubricating oil, especially PNA's with at least three aromatic rings. Another example of a physically active filter media is also disclosed in U.S. Pat. No. 4,977,871 wherein the filter media is mixed, coated, or impregnated with one or more additives normally present in lubricating oils. These additives are oil soluble such that they will be slowly released into the oil to replenish the additives in the oil as they are depleted during its use of the oil. Suitable inactive filter media may be found in today's conventional engine oil filters and include porous paper (e.g. pleated paper), glass fibers, spun polymer filament, and the like. The inactive filter media serves to retain and remove solid particles from the oil. The precise amount of active filter media used will vary with the particular function to be performed.

Although this invention has heretofore been described with specific reference to removing sludge from lubricating oils used in internal combustion engines, and/or in providing antioxidation protection, it can also be suitably applied to essentially any oil. For the purpose of this invention, lubricating oil is defined to include industrial oils, hydraulic oils and fluids, automatic transmission oil, two cycle oils, gear oils, power transmission fluids, and heat transfer oils that contains polar hydrocarbon sludge or varnish precursors from which sludge is formed. The invention may be further understood by reference to the following examples which are not intended to restrict the scope of the appended claims. In these examples tests are used, namely the Sludge Inhibition Bench (SIB) test for measuring sludge performance and Differential Scanning Calorimetry (DSC) for for measuring antioxidant performance. The amount of soot in an oil sample may be determined by thermal gravimetric analysis (TGA). TGA is an analytical technique in which an oil sample suspended on an arm of a thermobalance is heated and held within the constant temperature zone of a furnace through which a controlled atmosphere is passed. The loss or gain in sample weight is measured as a function of a temperature program applied to the furnace. The composition of the gas flowing through the furnace can be changed during the test run. A TGA procedure has been described by McGeehan and Fontana (Effect of Soot on Piston Deposits and Crankcase Oils-Infrared Spectrometric Technique for Analyzing Soot, SAE paper, 801368, 1981). Another TGA method is described in ASTM E1131, Standard Test Method for Compositional Analysis by Thermogravimetry. The DSC and SIB test procedures are as follows.

DSC TEST

A test sample of known weight is placed in a DSC 30 Cell (Mettler TA 3000) and continuously heated with an inert reference at a programmed rate under an oxidizing air environment. If the test sample undergoes an exothermic or endothermic reaction or a phase change, the event and magnitude of the heat effects relative to the inert reference are monitored and recorded. More specifically, the temperature at which an exothermic reaction begins due to oxidation by atmospheric oxygen is considered as a measure of the oxidative stability of the test sample. The higher the DSC Break Temperature, the more oxidatively stable the test sample. All DSC evaluations are performed using the DSC cell at atmospheric pressure and scanning temperatures from 50° C. to 300° C. (at least 25° C. above the start of the temperature scan) to avoid incorporating the initial heat flow between reference and sample into the baseline measurement. The oxidation onset temperature (or DSC Break Temperature) is the temperature at which the baseline (on the exothermal heat flow versus temperature plot) intersects with a line tangent to the curve at a point one heat energy threshold above the baseline. At times it is necessary to visually examine the plot to identify the true heat energy threshold for the start of oxidation.

SIB TEST

A test oil is formed for the evaluation of filter attractants by running a fully formulated non-dispersant passenger car lubricant for 3000 miles is a Ford Taurus for 3,000 miles of commuter operation. The test oil is circulated through a filter assembly in a laboratory rig and evaluated for the formation of sludge. In some cases the filter assembly contains a filter attractant and in some cases it does not. After circulation in the lab rig, two 10 gram samples of the oil are tested. The first sample is centrifuged prior to a test run at 210° C. for 4 hours. The second sample is preheated to 138° C. for 16 hours and then the test is run at 210° C. for 4 hours. The purpose of centrifugation is to remove separated sludge but to leave sludge precursors. The sludge precursors form additional sludge during the SIB test. The supernatant after centrifugation is subjected to heat cycling from about 150° C. to room temperature over a period of 4 hours at a frequency of about 2 cycles per minute. During the heating phase, a gas containing a mixture of about 0.7 volume percent of $SO_2$, 1.4 volume % NO and the balance air is bubbled through the test samples. During the cooling phase water vapor is bubbled through the test samples. At the end of the test, the liquid is centrifuged in weighed centrifuge tubes and the amount of sludge separated from the supernatant is determined and reported as milligrams of sludge. The smaller the amount of separated/centrifuged sludge, the more potent the filter attractant.

EXAMPLE 1

Polymer A 378.7 grams of Corcat P600, a polyethyleneamine commercially available fromm Virginia Chemicals, are added to 1563.5 grams of methanol and stirred until homogeneous. 125.0 grams of glycidoxypropyltrimethoxysilane are added and the solution stirred for 20 minutes. 198.2 grams of distilled water and 573.7 grams tetraethylorthosilicate are added and the solution stirred until a gel forms. The gel is removed from the flask and volatiles are removed in a vacuum oven at 100° C. and 0.5 mm Hg. The product is refluxed in distilled water for 4 hours and the wash decanted. The product is rinsed several times with distilled water and decanted. The product is dried in a vacuum oven at 100° C. and 0.1 mm Hg overnight. Nitrogen analysis: 9.53 wt. %, Theory 10%.

Polymer B 179.6 grams of Polymer A are added to 1,323 grams tetrahydrofuran and stirred until homogeneous. 49.7 grams of polyisobutylene succinic anhydride (PIBSA 48 available commercially from Exxon Chemical Company) are added and the solution refluxed 3 hours. The wash is then decanted, the solid rinsed with tetrahydrofuran and dried in vacuum oven at 110° C. at 0.1 mm Hg overnight.

Polymer C 208 g formalin are added to 91 g phenol in a Waring blender. High shear is begun and 200 g Corcat P600 is added. Gelation is almost instantaneous. The product is removed, immersed in liquid nitrogen and broken into a powder. It is added to a vacuum oven at 110° C./0.1 mm Hg overnight. It is removed from the oven and added to 2 liters distilled water and refluxed overnight. The wash is decanted, and the insoluble product rinsed with water and dried in vacuum oven overnight at 110° C./0.1 mm Hg. Nitrogen analysis: Theory: 15 wt. %; Found: 10.8 wt. %.

The polymers are evaluated for dispersant filter performance in a lab filtration rig. Three tests are used for measuring performance, Sludge Inhibition Bench (SIB) for measuring sludge performance, Thermal Gravimetric Analysis (TGA) for measuring soot/ash removal and Differential Scanning Calorimetry (DSC) for measuring antioxidant performance. The test consists of circulating 100 ml of a non-dispersant but otherwise fully formulated lubricant which has been used for 3000 miles in a Ford Taurus test car through a filter containing 0.5 grams of the compound under test for 8 hours. The resulting oils are evaluated in a dispersant SIB bench test and in DSC (oxidation stability). The oils are also evaluated for Soot/Ash by TGA. The SIB data are obtained for the samples both when not preheated, and also where samples are preheated overnight. The following results are observed and compared to other filter attractants.

| | IMPROVEMENT RELATIVE TO REFERENCE OIL* | | | | | |
|---|---|---|---|---|---|---|
| | SMALL LAB RIG | | | | LARGE LAB RIG | |
| ATTRACTANT POLYMER | % TREAT RATE | % REDUCTION ASH + SOOT | SIB | % DSC MINUTES INCREASE | % TREAT RATE | % REDUCTION ASH/SOOT |
| A | 0.5 | 37 | 62 | +4 | — | — |
| B | 0.4 | 10 | 74 | 10 | 2.4 | 34 |
| C | 0.5 | +6 | 67 | +6 | — | — |

The reference oil is obtained from a Ford Taurus test car operated for 3,000 miles with the same non-dispersant oil as Polymers A, B and C but with no polymer in the filter. These data show that all of these polymers are effective to remove sludge and varnish precursors.

EXAMPLE 2

Polymer D: Benzoquinone with 2-methylpentamethylene diamine 10.8 g benzoquinone (0.1 mole) are dissolved in 150 ml methanol. 11.6 g 2-methylpentamethylene diamine (m.w. 116, 0.1 mole) are slowly added to the quinone solution at room temperature. The resulting mixture is stirred at room temperature for 24 hours and the solid precipitate is filtered, washed with methanol and dried to yield 8.6 g.; mp>300° C.

Polymer E: Benzoquinone with DETA (diethylene triamine)

10.8 g benzoquinone (0.1 mole) is dissolved in 100 ml methanol. 10.3 g DETA (m.w. 103, 0.1 mole) are slowly added to the quinone solution at room temperature. The resulting mixture is refluxed for 3 hours, allowed to cool to room temperature and the solid precipitate is filtered, washed with methanol and dried. Yield= 8 g. Elemental analysis: C=55.69%, H=5.52%, N=16.22%.

Polymer F: Benzoquinone with TETA (triethylene tetramine) amine 10.8 g benzoquinone (0.1 mole) is dissolved in 100 ml methanol 14.6 g TETA (m.w. 146, 0.1 mole) are slowly added to the quinone solution at room temperature. The resulting mixture is refluxed for 3 hours, allowed to cool to room temperature and the solid precipitate is filtered, washed with methanol and dried. Yield= 10 g. Elemental analysis: C=54.73%, H=5.80%, N=15.72%. The polymers are tested as in Example 1 above with the following results:

| IMPROVEMENT RELATIVE TO REFERENCE OIL* | | | | |
|---|---|---|---|---|
| ATTRACTANT POLYMER | % TREAT RATE | % REDUCTION ASH/SOOT | % REDUCTION SIB | % DSC MINUTES INCREASE |
| D | 0.4 | 31 | 62 | 56 |
| E | 0.5 | 3 | 70 | 87 |
| F | 0.5 | 3 | 75 | 58 |

*The same reference oil is used as in Example 1.

The SIB results clearly suggests that these quinone-amine compositions are very effective in sludge reduction. These data show that all of these polymers are effective to remove sludge and varnish precursors.

EXAMPLE 3

Polymer G 163 grs. of benzoquinone is dissolved in methanol. 355 grs. of PAM are slowly added to the benzoquinone solution at room temperature. The resulting solution is refluxed for 2 hours, allowed to cool to room temperature and the solid precipitate is filtered, washed with methanol and dried.

Polymer G is evaluated for dispersant filter performance in the lab filtration rig. The test used for measuring performance was FT-IR, Fourier Transform Infrared spectroscopy. A fresh oil fully formulated except that it did not contain dispersant is compared by FT-IR with the same oil after 3,000 miles service in a Ford Taurus in commuter use. The increase in the integrated area of absorbance in the OH stretching region, 3700–3100 cm-1, 34.09 units, is used as a measure of oil oxidation and sludge formation during the 3,000 miles of commuter service. 100 grs. of the 3,000 mile used oil is circulated for 8 hours through a filter containing 0.5 grs. of polymer G. At the end of 8 hours the test oil is compared to the fresh oil. The integrated area of absorbance, 8 hour test oil vs. fresh oil is 10.95 units representing a 68% reduction in oxidation products and sludge in the used oil. The 68% reduction in oxidation products and sludge measured by infrared is similar to the 59% reduction in sludge measured by the SIB test for a repeat preparation of Polymer G designated Polymer H.

Polymer H

Benzoquinone with PAM (polyamine)

9.18 g benzoquinone (0.085 mole) are dissolved in 100 ml methanol. 20 g PAM (8.5 meq/g primary amine, 0.17 equivalent) are slowly added to the quinone solution at room temperature. The resulting solution is refluxed for 1 hour. The solution is then allowed to cool down to room temperature and the precipitate solid is filtered, washed with methanol and dried. Yield= 8.4 g. mp>275° C. (Elemental analysis: C 55.54, H 6.22, N 15.34)

Product I (This product is not a polymer):

Benzoquinone with Phenylenediamine 10.8 benzoquinone (mw 108, 0.1 mole) is dissolved in 100 ml methanol. 10.8 g phenylenediamine (m.w. 108, 0.1 mole) are slowly added to quinone solution at room temperature. The resulting solution is refluxed for 1 hour and allowed to cool down to room temperature. A precipitate forms which is filtered, washed with methanol and dried. Yield=11.4 g. The product is insoluble in mineral oil.

Polymer J

Polythiophene

In a 500-ml three-necked flask, 32.4 g of iron trichloride (FW162.2; 0.2 mole) are dissolved in 300 ml of dry chloroform under nitrogen. A solution of 8.4 g (0.1 mol) of thiophene in 20 ml of chloroform is then added dropwise, and the mixture is stirred for 24 hours at room temperature under nitrogen. A precipitate forms, and is collected on a Buchner funnel, washed with chloroform and dried. This polymer product is then suspended in aqueous ammonium hydroxide (pH of ca. 10, pH paper). The mixture is stirred for 12 hours at room temperature under nitrogen, refiltered, washed with water and dried. Yield 9.1 g.

Polymer K 18.6 g (0.2 mol) aniline is dissolved in 600 ml 1 M HCl and the solution is cooled to 0° to −5° C. A solution of 9.2 g (0.04 mol) ammonium peroxydisulfate, $(NH_4)_2S_2O_8$, in 100 ml 1 M HCl is then added dropwise with vigorous stirring during a period of 10 minutes. The temperature is maintained at 5° C. Ten to fifteen minutes after the reactants are mixed, the solution starts to show a green tint and becomes intensely green as a precipitate forms. The solution is filtered overnight at room temperature. The mixture is filtered and the precipitate cakes are washed with 500 ml of 1 M HCl until the filtrate becomes colorless. Upon drying under dynamic vacuum at room temperature for 24–48 hours, polyaniline hydrochloride is obtained.

To convert polyaniline hydrochloride into polyaniline base, the hydrochloride is suspended in aqueous $NH_4OH$ (approximately 100 ml of 0.1 M aqueous solution of $NH_4OH$ are used per gram of the hydrochloride) with stirring for 16 hours at room temperature. The pH of the solution is periodically adjusted to ca. 10 (pH paper) by the addition of a small amount of 1 M $NH_4OH$. The suspension is then filtered and the precipitate is washed out with ca. 400 ml of 0.1 M a $NH_4OH$ followed by five 50 ml of a 1:1 mixture of methanol and 0.2M NaOH. The polymer base is dried under vacuum at room temperature for 48 hours.

Benzoquinone with Poly (ethylenimine)

Polymer L 8,6 g polyethylenimine in 50 ml water are mixed with 10.8 g benzoquinone (0.1 mole) suspended in 500 ml water. The solution is stirred at room temperature for 24 hours. Filter the product. Yield=16 g.

Polymer M 8.6 g polyethylenimine in 50 ml water are mixed with 10.8 g benzoquinone (0.1 mole) in 500 ml methanol. The solution is stirred at room temperature for 24 hours. Filter the product. Yield=11.90 g.

Polymer N 9.18 g benzoquinone (0.085 mole) is dissolved in 500 ml methanol. 96 g Corcat (9.82 meg/g primary amine, 0.17 equivalent) are slowly added to the quinone solution at room temperature. The resulting solution is refluxed for 1 hour at temperature 70° C. Then the solution is allowed to cool down to room temperature and the precipitate solid is filtered, washed with methanol and dried.

| IMPROVEMENT RELATIVE TO REFERENCE OIL* | | | | |
|---|---|---|---|---|
| ATTRACTANT POLYMER OR PRODUCT | % TREAT RATE | % REDUCTION ASH + SOOT | % REDUCTION SIB | % DSC MINUTES INCREASE |
| H | 0.5 | 27 | 59 | 10 |
| I | 0.5 | 56 | 32 | 59 |
| J | 0.5 | 21 | 29 | 44 |
| K | 0.5 | 18 | 32 | 41 |
| L | 0.5 | 24 | 43 | 11 |
| M | 0.5 | 13 | 0 | 12 |
| N | 0.5 | 46 | 18 | 44 |

*The same reference oil is used as in Example 1.
These data show that all of these materials are effective to remove sludge and varnish precursors.

EXAMPLE 4

POLYAMINE/SILICON OXIDE COMPOSITE SYNTHESIS

To a tared (2228.0 g) 12-liter round bottom flask are added 378.75 g ($2.08\times10^{-3}$) Corcat P600 (formula weight 60,000) polyethyleneamine (Virginia Chemical) and 1563.5 g methanol. The flask is equipped with an overhead stirrer and the components are stirred until homogeneous. 125.0 g of gamma-glycidoxypropyltrimethoxysilane (Huels America) are added and the mixture is stirred for 20 minutes. 198.25 g of deionized water are added and it is stirred to homogenize the solution. 573.75 g of tetraethyhorthosilicate (Aldrich Chemicals) are added and stirring is allowed to continue until a gel is formed. The gel is removed from the flask, added to a vacuum oven at 100° C. and 0.1 mm Hg until the volatiles are gone. The final dry product weighs 381.73 g. The product is refluxed in distilled water for 4 hours and the wash decanted. It is then rinsed several times with distilled water over a sintered glass funnel. The material is dried in a vacuum oven 100° C./0.1 mm Hg to produce a powder weighing 366.72 g. Nitrogen Analysis: wt. % Nitrogen (theory/found) approximately 10/9.53.

EXAMPLE 5

179.66 g of the product from Example 4; 49.7 g of polyisobutylene succinic anhydride (PIBSA 48) and 1323 g of tetrahydrofuran are added to a 5-liter round bottom flask equipped with an overhead chilled water condenser, stirring rod with motor and heating mantle below. This is refluxed 3 hours (added a few boiling stones prior to reflux), and the wash decanted. The solid is rinsed by adding the wash back to the flask with fresh tetrahydrofuran and the wash decanted. It is dried in a vacuum oven at 110° C./0.1 mm Hg overnight. Total mass=174 g of solid.

EXAMPLE 6

POLYAMINE GEL SYNTHESIS 208.32 g of formalin, and 91.64 g of phenol are added to a quart sized waring blender. Mixing at high speed is begun and 200 g of Corcat P600 are added. A gel forms almost immediately. The gel is removed, frozen with liquid nitrogen, broken into powder and added to an oven at 110° C. and 0.1 mm Hg overnight. When removed from the oven the product weighs 134.15 g. The product and approximately 2 liters of distilled water are added into a flask equipped with condenser, stirrer and heating mantle. It is refluxed overnight, the wash decanted, rinsed twice and placed in vacuum oven overnight at 110° C./0.1 mm Hg. The dried product weighs 129.5 g. Nitrogen analysis: wt. % nitrogen: theory: approximately 15%; found: 10.85.

| IMPROVEMENT RELATIVE TO REFERENCE OIL* | | |
|---|---|---|
| | SIB TEST MGS. SLUDGE | |
| ATTRACTANT | PROCEDURE 1 | PROCEDURE 2 |
| Reference oil | 15 | 10.8 |
| Example 4 | 4.9 | 4.9 |
| Example 5 | 3.0 | 3.8 |
| Example 6 | 3.8 | 3.8 |

*The same reference oil is used as in Example 1. The lower the result, the better the performance. Under Prodecure 1, the samples are not preheated and the test is run at 210° C. for 4 hours. Under Procedure 2, the samples are preheated to 138° C. for 16 hours and then the test is run at 210° C. for 4 hours. These data show that all of these materials are effective to remove sludge and varnish precursors.

EXAMPLE 7

410.08 g Corcat P600 and 81.84 g Vikolox 16 are added to a Waring blender and stirred for 5 minutes. 68.8 g of gamma-glycidoxypropyltrimethoxysilane is then added, and gelation follows within about a minute. Gel is removed, weighed, (547.9 g), added to an oven, and heated under nitrogen purge at 100° C. for 8 hours. 301.53 g of dried product is recovered. Dried product is added to a 5-liter flask, followed by excess methanol and refluxed for 4 hours. The wash is decanted, the solid collected, and dried under vacuum to 60° C./0.1 mm Hg for 8 hours. Nitrogen theory: approximately 15 wt. %. Found 15.37 wt. %.

EXAMPLE 8

415.08 g Corcat P600 NS 60.0 g Vikolox are added to a Waring blender and stirred for 5 minutes. 5.0 g 1,4-p-benzoquinone (delivered as approximately 10 wt. % suspension in deionized water) is added and stirring continued for 2 minutes. 68.8 g of gamma-glycidoxypropyltrimethoxysilane is added and gelation follows within a minute. Gel is removed, weighed (609.3 g), added to an oven, and heated under a nitrogen purge at 90° C. for 24 hours. The product is removed from the oven, refluxed in excess methanol and the wash decanted. The recovered solid is added to the oven at 90° C. and nitrogen purged for 2 hours. The nitrogen purge is replaced with a vacuum line and the product dried overnight at 90° C./0.1 mm Hg overnight. The product yield is 228 g (84 wt. % of theoretical). Nitrogen theory: 18 wt. %, found 16.1 wt.%.

What is claimed is:

1. A method for removing sludge or varnish precursors from a lubricating oil comprising circulating the lubricating oil through a filter assembly having therein a plurality of discrete oil insoluble, oil wettable particles wherein each particle has dispersant or antioxidant functional groups that complex the sludge or varnish precursors and cause at least a portion of said sludge and varnish precursors to be immobilized on said particles, and the discrete particles are not incorporated with a substrate and are retained in said filter assembly.

2. The method of claim 1 wherein said each particle comprises a polymer having a dispersant functional group.

3. The method of claim 1 wherein said each particle comprises a crosslinked amine.

4. The method of claim 3 wherein before crosslinking, said amine is a polyamine having a number average molecular weight in the range of from about 100 to about 60,000.

5. The method of claim 3 wherein said amine is a polyethylene amine.

6. The method of claim 3 wherein said amine is selected from the group consisting of 2-methylpentamethylene diamine, diethylene triamine, triethylene tetramine and a polyethylene amine bottoms product formed in the manufacture of polyethylene amine which contains about 6–8 ethylene groups.

7. The method of claim 3 wherein said amine has been crosslinked with a component selected from the group consisting of silicon alkoxides, silanes, silicates, epoxides, quinones, and phenolformaldehyde compounds.

8. The method of claim 3 wherein said amine has been crosslinked with a component selected from the group consisting of glycidoxypropyltrimethoxysilane, tetraethylorthosilicate, benzoquinone, and polyisobutylene succinic anhydride.

9. A method for removing sludge or varnish precursors from a lubricating oil comprising (a) introducing the lubricating oil into a filter assembly having therein a plurality of discrete oil insoluble, oil wettable particles therein wherein each particle has dispersant or antioxidant functional groups that complex the sludge or varnish precursors and cause at least a portion of said sludge and varnish precursors to be immobilized on said particles, and the discrete particles are not incorporated with a substrate and (b) circulating the lubricating oil out of the filter assembly while retaining the discrete particles having the sludge or varnish precursors complexed to the dispersant or antioxidant functional groups within the filter assembly.

* * * * *